United States Patent [19]

Stearns

[11] Patent Number: 5,225,959
[45] Date of Patent: Jul. 6, 1993

[54] CAPACITIVE TACTILE SENSOR ARRAY AND METHOD FOR SENSING PRESSURE WITH THE ARRAY

[75] Inventor: Richard G. Stearns, Mountain View, Calif.

[73] Assignee: Xerox Corporation, Stamford, Conn.

[21] Appl. No.: 779,757

[22] Filed: Oct. 15, 1991

[51] Int. Cl.⁵ .................... H01G 7/00; G06F 3/02
[52] U.S. Cl. .................... 361/283; 341/33
[58] Field of Search .................... 361/290, 283; 200/DIG. 1; 340/324 M, 365 C, 712; 73/718, 724

[56] References Cited

U.S. PATENT DOCUMENTS

| | | |
|---|---|---|
| 3,958,234 | 5/1976 | Hoo .................... 340/324 M |
| 4,145,748 | 3/1979 | Eichelberger et al. .......... 364/862 |
| 4,233,522 | 11/1980 | Grummer et al. .......... 307/116 |
| 4,263,659 | 4/1981 | Hirata et al. .......... 364/709 |
| 4,274,752 | 6/1981 | Huber et al. .......... 400/477 |
| 4,290,052 | 9/1981 | Eichelberger et al. ..... 340/365 C |
| 4,307,383 | 12/1981 | Brienza .......... 340/365 R |
| 4,336,483 | 6/1982 | Smith .......... 318/662 |
| 4,377,049 | 3/1983 | Simon et al. .......... 40/465 |
| 4,394,643 | 7/1983 | Williams .......... 340/365 C |
| 4,400,758 | 8/1983 | Frame .......... 361/290 |
| 4,413,252 | 11/1983 | Tyler et al. .......... 340/365 C |
| 4,431,882 | 2/1984 | Frame .......... 200/5 A |
| 4,439,647 | 3/1984 | Calandrello et al. .......... 200/5 A |
| 4,492,958 | 1/1985 | Minami .......... 340/825.25 |
| 4,539,554 | 9/1985 | Jarvis et al. .......... 340/365 C X |
| 4,558,313 | 12/1985 | Garwin et al. .......... 340/709 |
| 4,561,002 | 12/1985 | Chiu .......... 340/365 C |
| 4,614,937 | 9/1986 | Poujois .......... 340/365 C |
| 4,616,213 | 8/1986 | Danish .......... 340/365 C |
| 4,728,931 | 3/1988 | Linder et al. .......... 340/265 C |
| 4,728,932 | 3/1988 | Atherton .......... 340/365 C |
| 4,731,694 | 3/1988 | Grabner et al. .......... 361/280 |
| 4,733,222 | 3/1988 | Evans .......... 340/365 C |
| 4,737,768 | 4/1988 | Lewiner et al. .......... 340/365 S |
| 4,740,781 | 4/1988 | Brown .......... 340/712 |
| 4,743,464 | 5/1988 | Larguier et al. .......... 427/58 |
| 4,743,895 | 5/1988 | Alexander .......... 340/712 |
| 4,758,830 | 7/1988 | Levien et al. .......... 340/712 |
| 4,771,277 | 9/1988 | Barbee et al. .......... 340/712 |
| 4,772,874 | 9/1988 | Hasegawa .......... 340/365 S |
| 4,812,833 | 3/1989 | Shimauchi .......... 340/712 |
| 4,839,512 | 6/1989 | Speck .......... 250/231 P |
| 4,857,684 | 8/1989 | Gratke .......... 200/600 |
| 4,862,151 | 8/1989 | Grauz et al. .......... 340/706 |
| 4,876,461 | 10/1989 | Gratke .......... 307/116 |
| 4,910,504 | 3/1990 | Eriksson .......... 340/712 |
| 4,920,343 | 4/1990 | Schwartz .......... 341/33 |
| 4,924,222 | 5/1990 | Antikidis et al. .......... 340/365 C |
| 5,016,008 | 5/1991 | Gruaz et al. .......... 341/33 |

OTHER PUBLICATIONS

U.S. Statutory Invention Registration, registration No. H716 Published: Dec. 5, 1989, McDonald et al.

"A High-Performance Silicon Tactile Imager Based on a Capacitive Cell", K. Chun, and K. D. Wise, IEEE Transactions on Electron Devices, vol. ED-32 No. 7, pp. 1196-1201, Jul. 1985.

"A 1024-Element Hight-Performance Silicon Tactile Imager", K. Suzuki, K. Najafi, and K. D. Wise, IEDM, pp. 674-677 (1988).

"128×128 Deformable Mirror Device", L. J. Hornbeck, IEEE Transactions on Electron Devices, ED-30 (5), pp. 539-545 (1983).

"Deformable mirror device spatial light modulators and their applicability to optical neural networks", D. R. Collins, J. B. Sampsell, L. J. Hornbeck, J. M. Florence, P. A. Penz and M. T. Gately, Applied Optics, 28(22), pp. 4900-4913 (1989).

*Primary Examiner*—Donald Griffin
*Attorney, Agent, or Firm*—Rosen, Dainow & Jacobs

[57] ABSTRACT

A capacitive tactile sensor array is formed of capacitive plates formed on a dielectric substrate, on which large area electronics is also deposited. A conductive film is spaced from the capacitive plates, to form the other plates of the sensor capacitors. This conductive film may be grounded. The large area electronics includes a circuit that provides outputs corresponding to the pressure applied to each of the sensor capacitors. A method is also disclosed for controlling the circuit to provide an output corresponding to the pressure applied to the conductive film.

15 Claims, 3 Drawing Sheets

CAPACITIVE TACTILE SENSOR ARRAY AND METHOD FOR SENSING PRESSURE WITH THE ARRAY

This invention relates to the provision of a capacitive tactile sensor array that employs large area electronics. The invention is also directed to a method for providing an output corresponding to the pressure applied to the capacitor sensor elements of the array.

BACKGROUND OF THE INVENTION

In many respects, the interface between computers and the physical world including people remains quite crude.

Many present input and interface media are not constructed to be used in a particularly rich or natural manner. For example, digitizing tablets often make use of special pens which necessarily constrain the quantity and quality of the information input through them (i.e. simple lines of uniform width and intensity). While for some circumstances such input devices are adequate, in many cases a more general tactile interface is desired.

Tactile sensors, i.e. sensors involving transducers which convert pressure (i.e. touch) information into electrical signals, have previously been constructed based upon several physical principles. Among these are the use of piezoresistivity, piezoelectricity, and capacitive sensing to measure the local force applied to a substrate.

Tactile capacitive sensor arrays have been disclosed in a number of U.S. Patents, such as, for example only, U.S. Pat. Nos. 5,016,008; 4,731,694; 4,740,781; 4,431,882; and 4,614,937. Such known arrangements do not generally have fine spatial resolution capabilities, and employ passive addressing systems that require the provision of addressing conductors on two separate substrates which must be aligned. This latter arrangement makes it especially difficult to fabricate large sensor arrays of high spatial resolution. In addition, it is difficult, in known capacitive sensor arrays, to provide outputs that are responsive to the degree of pressure applied to the capacitive sensor pads.

A large number of designs for creating arrays of capacitive cells have been discussed in the literature. (See, for example, "A High-Performance Silicon Tactile Imager Based on a Capacitive Cell", K. Chun and K. D. Wise, IEEE Transactions on Electron Devices, ED-32 (7), pp. 1196-1201 (1985); "A 1024-Element High-Performance Silicon Tactile Imager", K. Suzuki, K, Najafi, and K. D. Wise, IEDM, pp. 674-677 (1988); "128×128 Deformable Mirror Device", L. J. Hornbeck, IEEE Transactions on Electron Devices, ED-30 (5), pp. 539-545 (1983); and "Deformable mirror device spatial light modulators and their applicability to optical neural networks", D. R. Collins, et al. Applied Optics, 28(22), pp. 4900-4913 (1989)). In deformable mirror devices (DMDs), voltages are applied to one plate of each capacitive cell (each electrode on the glass substrate), to produce a deformation of the bridge or cantilever, which in turn will scatter an optical beam incident on the array. There has been no demonstration, however, that any of these arrangements can be made to have large areas.

SUMMARY OF THE INVENTION

The present invention is directed to the provision of an improved tactile sensor array that is readily capable of being fabricated in large sizes, and with a high spatial resolution.

In accordance with the invention, large area electronics is employed in the fabrication of two-dimensional tactile sensor arrays. In particular, sensor arrays based upon the measurement of capacitance are employed. The arrays of the invention are capable of providing high spatial resolution, with an adjustable sensitivity to force, largely by variation of the physical parameters of the sensor structures (in particular, the thickness d of a bridge structure, or the bulk modulus of an elastomer).

The read out of the mechanical loading for a given sensor may be obtained using TFTs and one or more simple amplifiers.

The general layout of the array may be similar in some respects to driver arrays for liquid crystal displays. In some cases, for example using transparent conductors, the sensors described employed in the invention may be combined with such liquid crystal displays (or even with two dimensional optical scan arrays), to produce very powerful interface media, based on large area electronics.

Briefly stated, in accordance with one embodiment of the invention, a tactile capacitive sensor array comprises a substrate having a first surface, and an integrated electronic circuit formed on the first surface. The circuit has a plurality of spaced apart first capacitor electrodes, output and input terminals, and active electronic elements separately coupling the capacitor plates to the input and output conductors. Second capacitor electrode means are spaced from the surface and have second capacitor electrode means with conductive regions aligned with a plurality of the capacitor electrodes to form a plurality of sensor capacitors therewith. A terminal arrangement is connected to the second capacitor electrode means.

In accordance with a further embodiment of the invention, a tactile capacitive sensor array comprises a plurality of capacitor sensors each having a first electrode and a second electrode, integrating amplifier means, a source of a charging voltage, means for selectively connecting the sensor electrodes to the source and the integrating amplifier means and means connecting the second electrodes in common to a terminal of fixed potential.

In accordance with a still further embodiment of the invention, a method is provided for sensing pressure on sensor capacitors of a tactile array having a matrix of a plurality of first capacitor plates arranged in rows and columns, the first capacitor plates forming sensing capacitor electrodes in combination with at least one other capacitor plate. The method comprises the steps of charging a given row of the sensor capacitors, and then selectively discharging the sensor capacitors to integrating amplifier means. As a result, the outputs of the amplifiers correspond to the pressure applied to the sensor capacitors of the respective rows of capacitors.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

The sensor array of the invention is comprised of two major design components, i.e. (1) An electronic circuit for addressing the elements of the array, and for reading out changes in the capacitance associated with each sensor cell, and (2) An array of the individual sensor cells, such as capacitive sensors. The sensor cells will be discussed first.

THE CAPACITIVE SENSOR ELEMENTS

Figure 1:
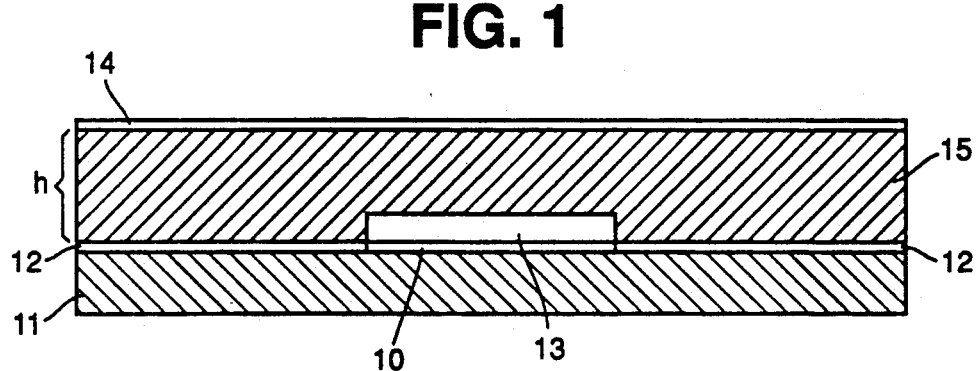
FIG. 1 is a cross sectional view of one construction of a capacitive sensing element that may be employed in the sensor array of the invention, in the undepressed state.

In order to fabricate a capacitive sensor element in accordance with one embodiment of the invention, as illustrated in FIG. 1, a thin film of metal or other electrically conducting material is provided on a region of a glass or other dielectric material substrate 11 to form one plate 10 of a capacitor, for example by metallizing this region of the substrate. A large area electronic circuit 12 is also formed on the surface of the substrate 11. The region of the plate 10 may be rectangular in shape, and may in fact be overcoated with a thin dielectric 13 if desired, to protect the metal from contact charging, or chemical corrosion.

In the arrangement of FIG. 1, a thin deformable conducting film 14 is provided above, and spaced a distance h from the metallized glass substrate 11. One technique for spacing the film 14 from the plate 10 is to adhere an elastomer material 15 of thickness h to the glass substrate 11. Since the conducting film 14 is deformable, it will be displaced toward the substrate in response to pressure from above, so that the film 14 will be displaced or bend toward the glass substrate 11. This displacement causes an increase in the local capacitance. The capacitor formed in this manner has associated with it the dielectric constant of the elastomer. Pressure applied to the elastomer causes deformation, which produces a change in capacitance. The plate 10 and film 14 can be patterned to correspond to an array of aligned rectangular conducting pads (reducing unwanted capacitive coupling), or more simply, the film 14 can be continuous and unpatterned.

The construction illustrated in FIG. 1 has a disadvantage that there may be hysteresis effects associated with the elastomer, so that, in some applications, the stability of the capacitance measurement may not be acceptable.

Figure 2:
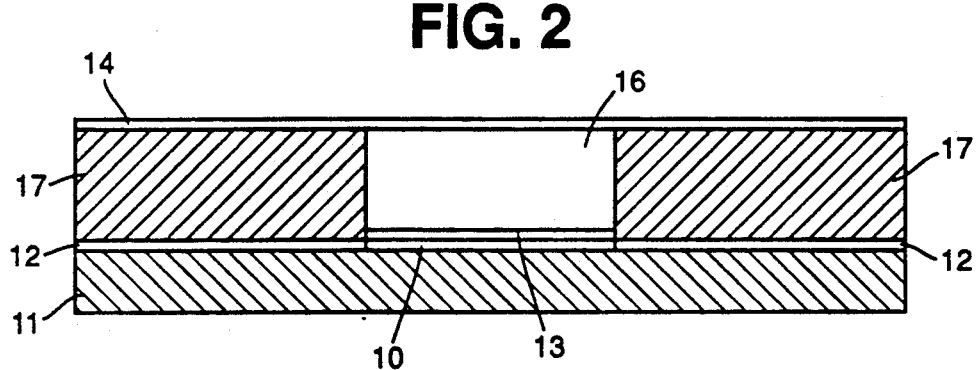
FIG. 2 is a cross sectional view of another construction of a capacitive sensing element that may be employed in the sensor array of the invention, in the undepressed state.

Another construction of a capacitive sensor element for use in the capacitive measurement of pressure, that may be employed in the sensor array of the invention, is illustrated schematically in FIGS. 2. This sensor consists of a capacitor that is distinguished from the arrangement of FIG. 1 by the provision of an air gap 16 laterally surrounded by a dielectric material 17 and formed in the region of the conductive pad defined by the plate 10. The spacing of the plate 10 and film 14 in the regions external of the sensing element itself may be effected by the material 17, which may be any suitable dielectric material.

Figure 3:
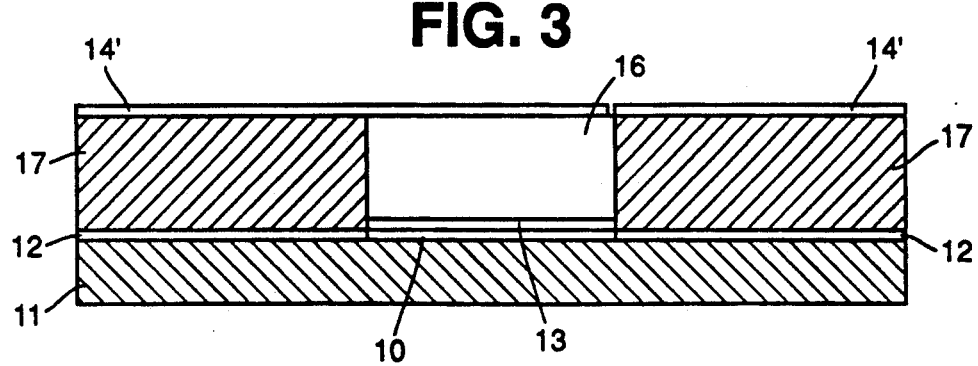
FIG. 3 is a cross sectional view of still another construction of a capacitive sensing element that may be employed in the sensor array of the invention, in the undepressed state.

In a further alternative, as illustrated in FIG. 3, instead of the bridge construction of FIGS. 1 and 2 (wherein the upper film 14, above the plate 10, "bridges" the upper surface of the elastomer 15 or air gap 16), the upper film 14' is cantilevered in the region of the gap 16, so that, in response to pressure on the cantilevered area the film can be bent downwardly toward the plate 10. In this construction it is also desirable to provide the thin dielectric layer 13 on the plate 10 in order to protect the plate from contact charging and chemical corrosion.

Considering the general nature of the above sensor constructions, assume that the thickness of the upper film material is d, the distance between the plate 10 and the upper film is h, and the effective area of the capacitor is A. For simplicity, also assume the capacitor to be roughly square in shape with sides of a dimension a, so that the area A of the capacitor is $a^2$. There are some constraints on the values of these geometric parameters. First, the spatial resolution of the sensor array will generally determine A (or a). Second, the unloaded capacitance of each capacitive cell may be required to be no less than a given value. Assume, then, for example, that the spatial resolution of the sensor array is desired to be of the order of a. The unloaded capacitance will then be of the order of:

$$C = \epsilon_0 a^2 / h.$$

Tactile sensors based on capacitive measurements have been fabricated for resolutions of the order ~1 mm, with C~1 pF. This implies from above that h~5 to 10 μm. The bridge thickness d is preferably selected such that a maximum expected load produces a deformation of the bridge of the order of h/2, thus causing a roughly 100% increase in the capacitance with maximum load. Relatively large bridges of this type may be formed using etched silicon wafers which are subsequently electrostatically bonded to the glass substrate.

Sensor arrays of higher spatial resolution, e.g. 100 μm, may also be desired. In such event, if a capacitance of ~0.1 pF to 1 pF is still desired per sensor cell, it follows that the gap h must be of the order of a micron or less. Structures of this type may be fabricated in a manner similar to that used in the construction of deformable mirror devices (discussed above).

A capacitor of lateral dimension ~100 μm, with an air gap of several tenths of one micron can be fabricated by stretching a thin metallized polymer over a grid structure fabricated on the glass substrate. Alternatively, an effective number of separate bridges or cantilevers, each bridge structure being only tens of microns in extent. An array of such smaller bridge or cantilever structures can then span the desired size of the sensor cell unit (e.g. 100 μm × 100 μm), with the structures being electrically wired in parallel. This may be necessary, since current techniques to create bridge and cantilever structures cannot easily produce the kind of width to gap ratio that is required for the single sensor (e.g. 100 μm × 100 μm × 0.5 μm). In the construction of these bridges or cantilevers, the thickness of the conducting bridge material is thus selected such that the maximum expected load will produce a deflection that yields a reasonable (i.e. of the order of 50–100%) change in the capacitor gap spacing h. The bridges or cantilevers are preferably constructed so that, in the limit of large loading, the electrodes of the capacitor can touch one another (in the absence of the protective film 13), without breakage.

Alternatively, the construction of the sensor elements may employ micromachining techniques, for the fabrication of elements which allow transduction of pressure into capacitance, and whose spatial dimensions are compatible with the desired resolution of the sensing array. For example, micromechanical structures such as springs and sliders can be used to measure not only the magnitude of an applied force, but also its direction. (See, for example, "Integrated Movable Micromechanical Structures for Sensors and Actuators", L. Fan, Y. Tai and R. S. Muller, IEEE Transactions on Electric Devices, 35(6), pp. 724–730 (1988).

THE ELECTRONIC CIRCUIT

Large area electronic components are a key to the fabrication of tactile sensor arrays, over large surfaces, in accordance with the invention. There are many possible ways to measure the change in capacitance associated with a two-dimensional array of sensors, of the type described above. In one example, it will be assumed that for each individual capacitive sensor on the array the "plate" that is physically held above the glass substrate (i.e. by a bridge support, or elastomer), is always maintained at ground potential.

Figure 4:
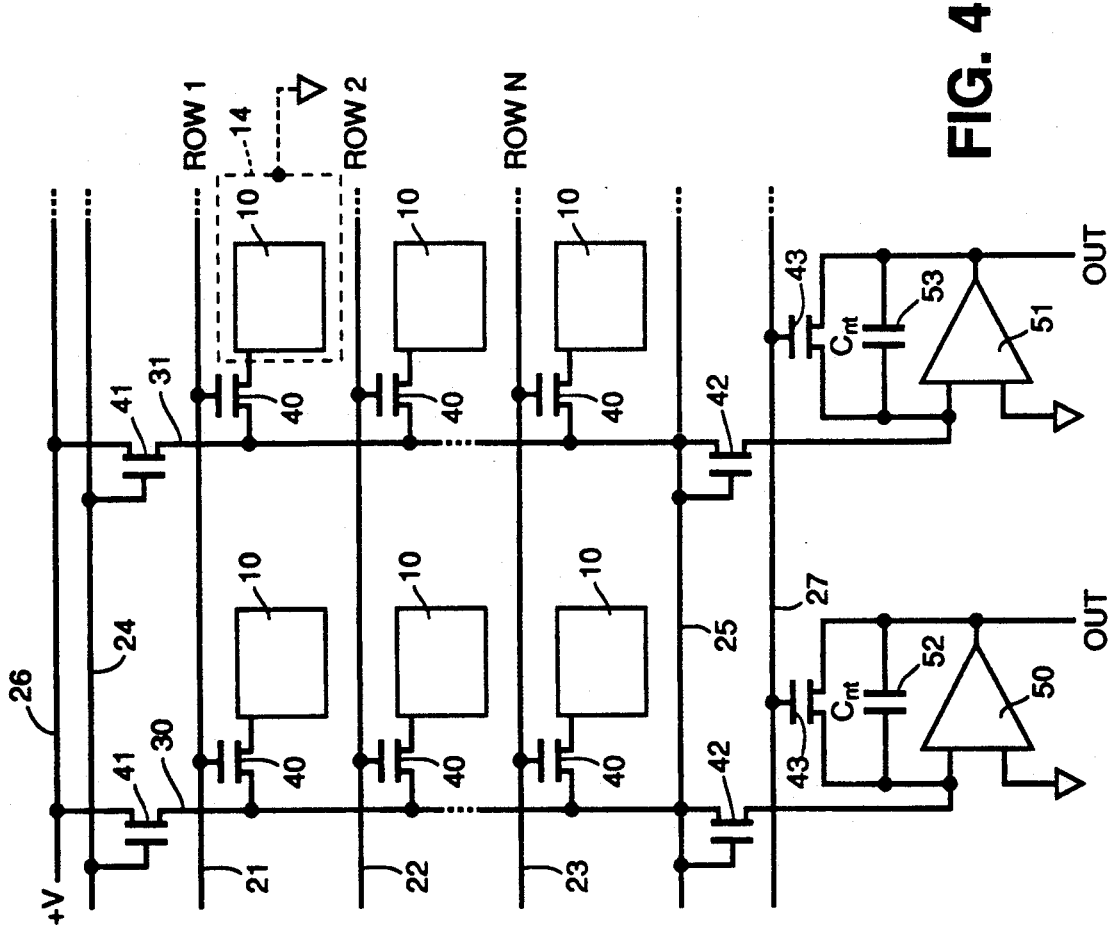
FIG. 4 illustrates a schematic diagram of a circuit that may be employed in the sensor array of the invention.

One embodiment of a system in accordance with the invention for measuring the capacitance of the sensors under this assumption is shown in FIG. 4. FIG. 4 is a schematic illustration of the circuit that may be employed for the large area electronic circuit 12 as illustrated in FIGS. 1-3, this circuit being formed by conventional techniques on the glass or other dielectric substrate 11. The capacitive plates 10 are illustrated as square conductive areas defining the metallized lower plate of the sensor, although it is apparent that the invention is not limited to this shape of capacitor plates. The circuit includes a plurality of row conductors 21, 22, 23, etc. and a plurality of column conductors 30, 31, etc. The row lines 21, 22, 23, etc. are connected to the gates of separate TFTs 40. The drain of each of these transistors is connected to a separate capacitor plate 10, and the sources of the transistors are connected to the column line 30, 3 of the respective column. The column lines 30, 31 are connected to the drains of separate TFTs 41. The gates of these transistors 41 are connected to a common line 24, and the sources of these transistors 41 are connected to the positive supply line 26. In addition, the column lines 30, 31 are connected to the sources of separate TFTs 42 having their gates connected to a common line 25. The drains of the transistors 42 are coupled to the inputs of separate integrating amplifiers 50, 51. Each of the amplifiers 50, 51 has a feedback circuit comprised of an integrating capacitor 52, 53 shunted by the source-drain path of a separate TFT 43. The gates of these transistors are connected to a common reset line 27.

The sensors are addressed via the these rows and column lines. For example, the capacitors may be sensed by initially charging a given row of capacitors to a voltage V (of order 10 V). This is done by bringing line 24 in FIG. 4 high, and line 25 low, as illustrated at time $t_1$ in FIG. 5. One of the row gate lines 21, 22, 23, etc. is then brought high (at the time $t_2$ of FIG. 5), to charge all capacitors in that row to the voltage V of the line 26. During this charging step, the reset line 27 is kept high, so that the integrating capacitors 52, 53 associated with each column of sensors is shorted, and the output from each column is maintained at ground potential, i.e. the output of the respective amplifier 50, 51.

Figure 5:
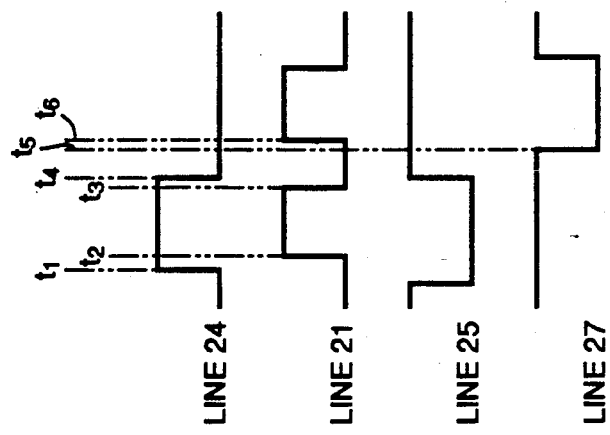
FIG. 5 is a time diagram illustrating one mode of operation of the circuit of FIG. 4.

Once the addressed row of capacitors has been charged to the voltage V, the TFT's for that row are turned off (i.e. the row gate line 21, 22 or 23 is brought low at the time $t_3$ of FIG. 5). Line 24 is now brought low at the time $t_4$, while line 25 is simultaneously brought high. Some time is allowed for the potential of the metal lines corresponding to the column address circuitry to relax to ground potential. The reset line 27 is then brought low at time $t_5$, so that now any further current flowing toward the inputs of the amplifiers results in the charging of the respective integration capacitor. Next the same row gate line is again brought high at time $t_6$ of FIG. 5. The row of charged capacitors will now discharge to the virtual ground associated with the amplifier input. This in turn charges the respective integrating capacitor 52, 53. When the sensor capacitors are fully discharged, the voltage across the capacitor 52, 53 provides a direct measure of the charge that was required to bring the sensor capacitor of the associated column to a voltage V. Since this charge Q is simply equal to the product of the sensor capacitance with the voltage V, it is a direct measure of the capacitance of the sensor capacitor, at the time of its charging. It is to be noted that the effect of the overlap capacitance between the column and row lines cancels, so that there is little net voltage across the capacitors 52, 53 associated with the switching signals applied to the row gate lines. Hence the capacitance of the sensors in the addressed row of the 2-D array is determined by reading the voltage at each amplifier output. Since each capacitance value is a function of the gap h between the plates of each sensor capacitor, the values reflect directly the mechanical loading of the sensors. The above discussed process is repeated in the following cycles for separately addressing the further rows of sensors.

The amplifiers 50, 51 illustrated in the schematic of FIG. 4 may be a known variety of operational amplifier. Such circuitry may be fabricated on the array using poly-silicon. Alternatively, the amplifiers may be part of a separate, crystalline silicon, circuit. Instead of employing a separate amplifier for each column, it is of course possible to provide a single amplifier for a plurality of column lines, and to sequentially switch each sensor cell in a row through that amplifier, i.e. in a manner similar to a scan array structure. This latter procedure, however, may result in relatively slow reading of the data from the two dimensional array.

Figure 6:
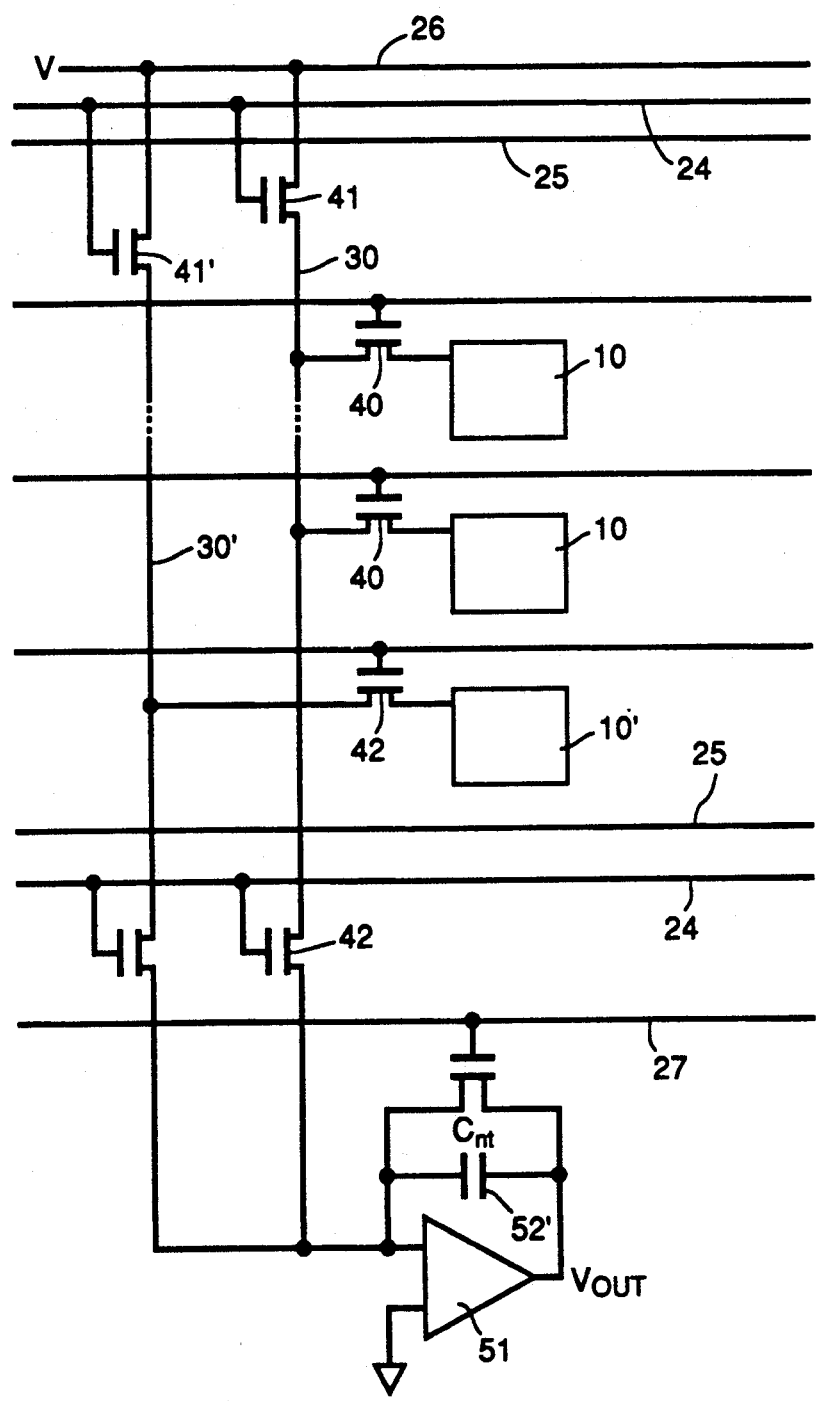
FIG. 6 illustrates a modification of the circuit of FIG. 4

A modification of the circuit is shown in FIG. 6. In this circuit, an additional row of dummy sensors 10' is included. These are sensors that have the same unloaded capacitance as the other sensors, but are fabricated so as to be pressure insensitive. This can be done, for example by making the bridge thickness of the dummy sensor very large. This row of dummy sensors, as indicated in FIG. 6, is made to charge to the potential V via a line 30' and TFT 41', when a row of normal sensors discharges. The dummy sensors 10' are discharged to ground potential while the normal sensors 10 are charged to potential V. By summing the currents from any given normal sensor, in a given row, with the current from the dummy sensor in the respective same column, a differential measurement is made. Preferably, if the unloaded capacitance of each of the normal sensors in a given column is equal to the capacitance of the dummy sensor in that column, then the voltage read out across the integrating capacitor 52' will be directly proportional to the change in capacitance of the addressed sensor, due to mechanical loading. This differential measuring arrangements also helps to cancel out some effects of parasitic capacitance.

It may also be noted that if some arrangement is made to segregate the top "plates" (i.e. supported bridge structures) of the capacitors into either separate rows or columns, which may be separately addressed, then the switching circuitry of FIGS. 4 and 6 may be somewhat simplified at the cost of increased difficulty in fabrication.

It was discussed earlier that deformable mirror displays share some structural similarities to the capacitive array employed in the invention. The charging of a row of sensor capacitors in the array of the invention, however, does not produce a significant deformation of the sensor capacitor, as it does in deformable mirror displays. This effect is a result of the scale of the electrostatic force. The electrostatic force per unit area between two parallel plates of separation h may be written as Force/Area $\sim \epsilon_0 V^2 / 2h^2$. If it is assumed that $V \sim 10V$, and $d \sim 0.5$ μm, then the force/area is of the order of $2 \times 10^3$ Newton/m². Typical forces associated with tactile sensing may be of the order of 1 gram/mm², which is $\sim 10^5 N/m^2$. Hence it is evident that the electrostatic forces will be smaller than the typical loading that is to be measured, so that, by proper design of the capacitors, electrostatic deformation will play a negligible role.

It is preferable to cover the front surface of the sensors with a "skin", to offer some protection of the capacitive structures to mechanical and chemical damage. Such a protective coating must be dimensioned, and have physical characteristics, so that spatial resolution of the sensor performance is not seriously degraded.

The present invention thus provides a tactile capacitive sensor array that employs large area electronics, for example of amorphous silicon or polysilicon. The array of the invention, which yields information concerning touch, with high spatial resolution, is of value as an input device to computers, as a component of interactive media, and/or as an interface for computers to interrogate the state of the physical world (for example, as in robotics).

It is of course apparent that the structure in accordance with the invention may be flexible and/or non-planar.

While the invention has been disclosed and described with reference to several embodiments, it will be apparent that variations and modification may be made therein, and it is therefore intended in the following claims to cover each such variation and modification as falls within the true spirit and scope of the invention.

What is claimed is:

1. A tactile capacitive sensor array comprising a substrate having a first surface, an integrated electronic circuit formed on said first surface, said circuit having a plurality of spaced apart first capacitor electrodes, output and input terminals, and active electronic elements separately coupling said capacitor electrodes to said input and output conductors, and second capacitor electrode means spaced from said surface, said second capacitor electrode means having conductive regions aligned with a plurality of said first capacitor electrodes to form a plurality of sensor capacitors therewith, and a potential applying arrangement connected to said second capacitor electrode means.

2. The tactile capacitive sensor array of claim 1 wherein said substrate circuit and second capacitor electrode means are substantially optically transparent.

3. The tactile capacitive sensor array of claim 1 wherein said first capacitor electrodes are arranged in rows and columns.

4. The tactile capacitive sensor array of claim 1 wherein said active electronic elements comprise means for selectively charging said sensor capacitors, integrating amplifier means, and means for selectively applying charges on said sensor capacitors to said integrating amplifier means, whereby the output of said integrating amplifier means corresponds to pressure applied to a respective sensor capacitor.

5. The tactile capacitive sensor array of claim 1 wherein said second capacitor electrode means are connected in common to a fixed potential.

6. A tactile capacitive sensor array comprising a plurality of capacitor sensors each having a first electrode and a second electrode, integrating amplifier means, a source of a charging voltage, means for selectively connecting said sensor electrodes to said source and said integrating amplifier means and means connecting said second electrodes in common to a point of fixed potential.

7. The tactile capacitive sensor array of claim 6 wherein said means for selectively connecting said sensor electrodes comprise TFTs.

8. The tactile capacitive sensor array of claim 6 wherein said capacitor sensors are arranged in a matrix of a plurality of rows and columns, and said means for selectively connecting said sensor electrodes comprises transistor means connected to selectively charge all of the capacitors of a row, and transistor means for selectively connecting said capacitors to discharge via said integrating amplifier means.

9. The tactile capacitive sensor array of claim 8 wherein said integrating amplifier means comprises a separate integrating capacitor for each column of said capacitors, and said transistor means for selectively connecting said capacitors to discharge via said integrating amplifier means comprises means for discharging said capacitors of a given row via separate said amplifiers.

10. The tactile capacitive sensor array of claim 8 further comprising a fixed capacitor for each of the columns of said matrix, said selectively connecting means comprising means for selectively connecting said fixed capacitors to said source and integrating amplifier means.

11. The tactile capacitive sensor array of claim 6 wherein said first electrodes, integrating amplifier means and selectively connecting means are arranged on a common substrate.

12. The tactile capacitive sensor array of claim 11 wherein said second electrode means comprises a common conductive film forming said sensor capacitors with each of said first electrode means.

13. A method for sensing pressure on sensor capacitors of a tactile array having a matrix of a plurality of first capacitor plates arranged in rows and columns, said first capacitor plates forming sensing capacitor electrodes in combination with at least one other capacitor plate, said method comprising:
  charging a given row of said sensor capacitors;
  then selectively discharging said sensor capacitors to integrating amplifier means, whereby the outputs of said amplifier means correspond to the pressure applied to the sensor capacitors of the respective rows of capacitors.

14. The method of claim 13 wherein said step of charging said sensor capacitors comprises coupling a voltage source to the first capacitor plates of a row of said sensor capacitors while isolating said first capacitor plates from said integrating amplifier means, and said step of discharging said sensor capacitors comprises discharging said sensor capacitors to said integrating amplifier means while isolating said first capacitor plates from said source of voltage.

15. The method of claim 14 wherein said step of discharging comprises discharging said sensor capacitors to separate integrating amplifiers.

* * * * *